United States Patent [19]

Bellmann et al.

[11] 3,852,239
[45] Dec. 3, 1974

[54] ADAMANTANE BASE POLYBENZOXAZOLE

[75] Inventors: Gunter Gert Bellmann, Geneve;
Alain Maurice Groult, Annemasse;
John Harry Arendt,
Collonge-bellerive, all of France

[73] Assignee: Etat Francais, represente par le Ministre d'Etat Charge de la Defense Nationale-Delegation Ministerielle Pour l'Armement-Direction des Recherches et Moyens d'Essais, Paris, France

[22] Filed: June 21, 1973

[21] Appl. No.: 372,043

[30] Foreign Application Priority Data
June 21, 1972 France .................... 72.22291

[52] U.S. Cl. ................ 360/46.5 R, 117/161 UN, 260/32.6 N, 260/50, 260/47 CP, 260/49, 260/63 R, 260/65, 260/78 TF
[51] Int. Cl. ........................................ CO8g 33/02
[58] Field of Search ............ 260/47 CP, 49, 65, 50, 260/465 R, 78 TF, 63 R

[56] References Cited
UNITED STATES PATENTS

| | | | |
|---|---|---|---|
| 3,230,196 | 1/1966 | Moyer, Jr. ................. | 260/47 |
| 3,306,876 | 2/1967 | Kantor et al. ............... | 260/47 |
| 3,332,907 | 7/1967 | Angelo et al. ............... | 260/47 |
| 3,376,257 | 4/1968 | Nakanishi et al. ............ | 260/47 |
| 3,449,296 | 6/1969 | Angelo et al ............... | 260/47 |
| 3,563,950 | 2/1971 | Steinmann et al. ............ | 260/47 |

Primary Examiner—Lester L. Lee
Attorney, Agent, or Firm—Larson, Taylor & Hinds

[57] ABSTRACT

Polybenzoxazole constituted by recurrent units forming macromolecular chains and corresponding to one of the two following formulas:

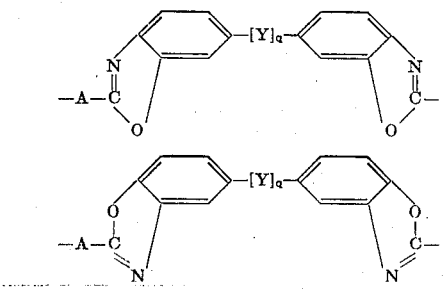

in which Y represents a divalent atom or group and q is 0 or 1, A being a divalent organic group.

Group A has one of the two following formulas:

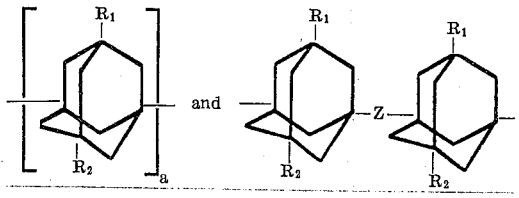

where a is a whole number equal to 3 at the most, $R_1$ and $R_2$ representing atoms or groups selcted from among the following: H, alkyl with 25 carbon atoms at the most, $CF_3$, $Si(R_3)_3$, adamantyl, phenyl, alkoxy with 20 carbon atoms at the most, $O-Si(R_3)_3$, $R_3$ being a phenyl radical or alkyl radical with 20 carbon atoms at the most, and Z representing a divalent atom or group.

This polybenzoxazole is useful in applications that require use of transparent or weakly colored material, especially in aerospace construction, for the manufacture of windows or visors or for production of transparent or translucent protective varnishes.

1 Claim, No Drawings

ADAMANTANE BASE POLYBENZOXAZOLE

BACKGROUND OF THE INVENTION

The present invention relates to a polybenzoxazole constituted by recurring units forming macromolecular chains, corresponding to one of the two following formulas:

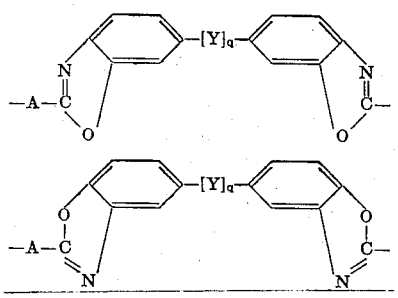

in which Y represents a divalent atom or group and q is 0 or 1, A being a divalent organic group.

Such polybenzoxazoles are known in which the symbol A represents an aliphatic, cycloaliphatic or aromatic group, or a combination of such groups.

Because of the presence of benzoxazole groups

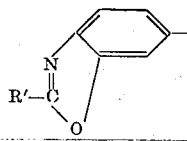

the known polybenzoxazoles generally have thermal stability and resistance to oxidation by air to a high degree, especially in the case in which R' is an aromatic group or a predominantly aromatic group. This property makes these polymers especially useful, particularly for the manufacture of sheets, films and protective coatings, used particularly in industry for insulation of conductive cables and electric windings in apparatus intended to withstand high temperature. The other properties of the polybenzoxazoles, namely their dielectric constant, their mechanical strength at ordinary and high temperature, their inertia with respect to chemical attack and the action of organic solvents are likewise very advantageous.

In any case, however, the known polybenzoxazoles, especially the aromatic polybenzoxazoles, are generally strongly colored, which makes it impossible to use them in certain instances that require the use of transparent or at least very weakly colored materials. This is the case, for example in aerospace construction and in particular in what concerns the manufacture of windows or shields, or in the case of transparent of translucent protective varnish.

On the other hand, whereas the aliphatic polybenzoxazoles are soluble in many organic solvents, which is very advantageous in view of their use and allows their ready use as films or coatings, but have a temperature for starting thermal decomposition that is much lower than that of the aromatic polybenzoxazoles, the latter are insoluble in organic solvents and cannot be dissolved, except in very strong chemical agents such as concentrated sulfuric acid.

The object of the invention is to furnish a colorless or at the very most slightly colored polybenzoxazole with resistance to thermal decomposition of the same order as that of the aromatic polybenzoxazoles and a solubility in organic solvents approaching that of the aliphatic polybenzoxazoles, still having moreover physical characteristics, as well as chemical and mechanical characteristics, that are at least as good as those of known polybenzoxazoles.

SUMMARY OF THE INVENTION

To attain this, the polybenzoxazole of the invention is characterized in that the A group has one of the two following formulas:

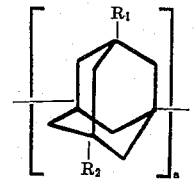

or

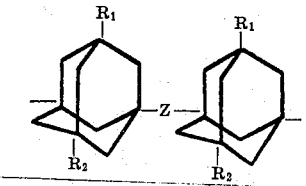

where a is a whole number equal at most to 3, $R_1$ and $R_2$ representing atoms or groups selected from among the following: H, alkyl with 20 carbon atoms at the most, $CF_3$, $Si(R_3)_3$, adamantyl, phenyl, alkoxy with 20 carbon atoms at the most, $O-Si(R_3)_3$, $R_3$ being a phenyl radical or an alkyl radical with 20 carbon atoms at the most, and Z representing a divalent atom or group.

Thus, the object of the invention is attained through the presence in each recurring unit of the polybenzoxazole, of at least one adamantyl group, i.e., a group derived from adamantane (tricyclo[3,3,1,1$^{5,7}$]decane).

The invention also relates to a process for the preparation of a polybenzoxazole according to which there is reacted, in equimolar proportions, at least one compound of the general formula:

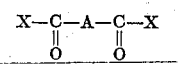

in which A represents a divalent organic group and X is a halide or a group of the formula -OR, R being one of the following atoms or groups: H, alkyl with at the most 20 carbon atoms, phenyl and benzyl, with at least one aromatic bis-ortho-hydroxyamine of the general formula:

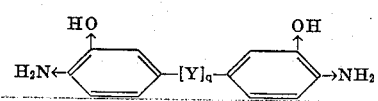

in which the arrows indicate isomerism, Y being a divalent atom or group, and q being 0 or 1.

Such a process is already known, in the case in which A is an aliphatic, cycloaliphatic or aromatic group or a combination of such groups.

The process of the invention is characterized in that the group A has one of the two following formulas:

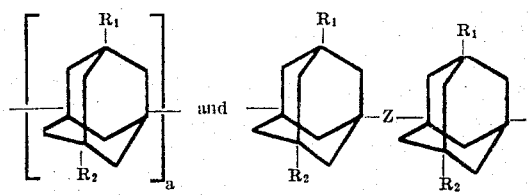

where a is a whole number at the most equal to 3, $R_1$ and $R_2$ representing atoms or groups selected from among the following: H, alkyl with 20 carbon atoms at the most, $CF_3$, $Si(R_3)_3$, adamantyl, phenyl, alkoxy with 20 carbon atoms at the most, $-O-Si(R_3)_3$, $R_3$ being a phenyl radical or an alkyl radical with 20 carbon atoms at the most, Z representing a divalent atom or group.

DETAILED DESCRIPTION

Preferably there are selected as starting products for the process of the invention materials that will allow production of a polybenzoxazole with thermal stability as high as possible. For this, the atoms or groups designated by symbols Y and Z are preferably from the following atoms or groups:

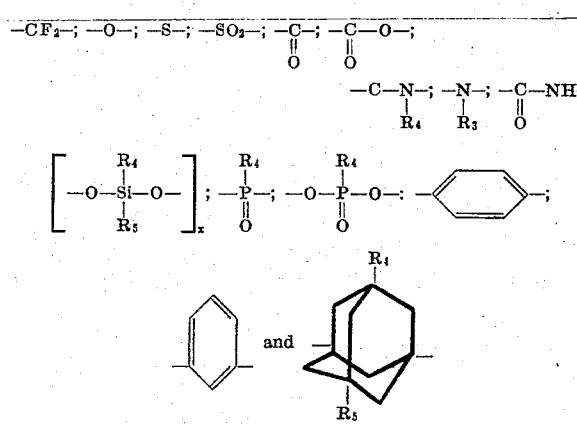

and thermostable combinations of these atoms or groups, $R_4$ and $R_5$ each representing an alkyl group or an alkoxy group with 20 carbon atoms at the most, or a phenyl or phenoxy group and x is a whole number, equal to 3 at the most.

Thus, as compound of the general formula:

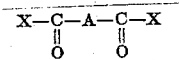

there is preferably used one of the following diacids or dihalides, especially dichlorides or even alkyl diesters of phenyl or benzyl:
1,3-dicarboxy adamantane
1,3-dimethyl 5,7-dicarboxy adamantane
1,3-di-trifluoromethyl 5,7-dicarboxy adamantane
1,3-dimethoxy 5,7-dicarboxy adamantane
1,3-di-trimethylsilyl 5,7-dicarboxy adamantane
1,3-di-trimethylsiloxy 5,7-dicarboxy adamantane
1,3-diphenyl 5,7-dicarboxy adamantane
3,3'-dicarboxy bi-adamantane
3,3',5,5'-tetramethyl 7,7'-dicarboxy biadamantane
tetrakis 3,3',5,5'-(trifluoromethyl) 7,7'-dicarboxy bi-adamantane
tetrakis 3,3',5,5' (trimethylsilyl) 7,7'-dicarboxy bi-adamantane
tetrakis 3,3',5,5'-(trimethylsiloxy) 7,7'-bi-adamantane 3,3',5,5'-tetramethoxy 7,7'-dicarboxy bi-adamantane
3,3',5,5'-tetraphenyl 7,7'-dicarboxy bi-adamantane
3,3'-dicarboxy diadamantyl ether
3,3'-dicarboxy diadamantyl ketone
3,3'-dicarboxy diadamantyl sulfone
3,3'-dicarboxy diadamantyl difluoromethane
bis-1,4-(3-carboxy adamantyl) benzene
bis dimethyl (3-carboxy adamantyl) silane
bis diphenyl (3-carboxy adamantyl) silane
bis dimethyl (3-carboxy adamantoxy) silane
bis diphenyl (3-carboxy adamantoxy) silane
3,3'-dimethyl 5,5'-dicarboxy diadamantyl ether
3,3'-dimethyl 5,5'-dicarboxy diadamantyl ketone
3,3'-dimethyl 5,5'-dicarboxy diacarboxy diadamantyl sulfone
3,3'-dimethyl 5,5'-dicarboxy diadamantyl difluoromethane
bis 1,4-(3-methyl 5-carboxy adamantyl) benzene
bis dimethyl (3-methyl 5-carboxy adamantyl) silane
bis diphenyl (3-methyl 5-carboxy adamantyl) silane
bis-dimethyl (3-methyl 5-carboxy adamantoxy) silane
bis diphenyl (3-methyl 5-carboxy adamantoxy) silane 3,3'-diphenyl 5,5'-dicarboxy diadamantyl ether
3,3'-diphenyl 5,5'-dicarboxy diadamantyl ketone
3,3'-diphenyl 5,5'-dicarboxy diadamantyl sulfone
3,3'-diphenyl 5,5'-dicarboxy diadamantyl difluoromethane
bis 1,4-(3-phenyl 5-carboxy adamantyl) benzene
bis dimethyl (3-phenyl 5-carboxy adamantyl) silane
bis-diphenyl (3-phenyl 5-carboxy adamantyl) silane
bis dimethyl (3-phenyl 5-carboxy adamantoxy) silane bis diphenyl (3-phenyl 5-carboxy adamantoxy) silane
One of the following compounds is preferably used for
the aromatic bis-ortho-hydroxyamine:
3,3'-dihydroxy benzidine
3,3'-diamino 4,4'-dihydroxy diphenyl
3,3'-dihydroxy 4,4'-diamino diphenylsulfone
3,3'-diamino 4,4'-dihydroxy diphenylsulfone
3,3'-dihydroxy 4,4'-diamino diphenyl ether
3,3'-diamino 4,4'-dihydroxy diphenyl ether
3,3'-dihydroxy 4,4'-diamino benzophenone
3,3'-diamino 4,4'-dihydroxy benzophenone
3,3'-dihydroxy 4,4'-diamino diphenyl thioether
3,3'-diamino 4,4'-dihydroxy diphenyl thioether
3,3'-dihydroxy 4,4'-diamino diphenyl difluoromethane 3,3'-dihydroxy 4,4'-diamino diphenyl difluoromethane bis 1,3 (3-amino 4-hydroxy phenyl) adamantane
1,3 bis dimethyl 5,7-(3-amino 4-hydroxy phenyl) adamantane
bis dimethyl (3-amino 4-hydroxy phenyl) silane
bis dimethyl (3-hydroxy 4-amino phenyl) silane
bis diphenyl (3-amino 4-hydroxy phenyl) silane
bis diphenyl (3-hydroxy 4-amino phenyl) silane
bis dimethyl (3-amino 4-hydroxy phenoxy) silane
bis dimethyl (3-hydroxy 4-amino phenoxy) silane bis diphenyl (3-amino 4-hydroxy phenoxy) silane
bis diphenyl (3-hydroxy 4-amino phenoxy) silane The aromatic bis-ortho hydroxyamines can be used either in the form in which the amino groups are free, or in the form in which these groups are salted by a strong mineral acid such as hydrochloric acid. The latter case offers the advantage of easier management of the process on the industrial scale, simplifying manipulation and stocking of the primary material. In fact, amine salts, e.g. amino hydrochlorides, are more stable than the corresponding amines. The only drawback in use of amines in the form of a salt consists in the need to use, as the case requires, a greater quantity of organic base to allow the polycondensation reaction, and also sometimes intermediate prepolymers (polyamides) are obtained that have a lower molecular weight than when the amine is used in the free state.

According to a first embodiment of the process, which is moreover the preferred embodiment, there is used as primary starting compound one or more acid halides of the formula

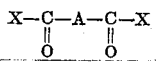

The reaction is effected in two distinct steps of which the first is a polycondensation that allows production of a soluble, film-producing polyhydroxyamide, and the second is a transformation of this intermediate product into polybenzoxazole by intramolecular cycling, effected by simple heating or under the influence of a suitable dehydrating chemical agent, the said second step being effected after having put the intermediate product into a form corresponding to the form that is desired for the final product, e.g. a film.

This embodiment of the process is of great interest because it allows production of polybenzoxazole films with an especially high mechanical strength because the cycling phase can be accompanied by drawing of the polyhydroxyamide film.

The polyhydroxyamide molecules that are obtained by polycondensation are recurrent units of the following general formula:

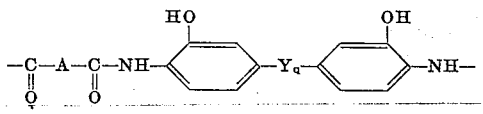

The polybenzoxazole molecules obtained by cycling are recurrent units of the following general formula:

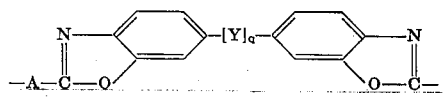

According to this first embodiment of the process, the polycondensation is effected in a liquid reaction medium constituted by a solution of at least one of the starting compounds in at least one organic solvent capable of dissolving at least one of the starting compounds, preferably the two kinds of the said starting compounds, the said solvent not reacting to any appreciable degree with one of the said compounds. For the organic solvent there can especially be used inert polar solvents, liquid at ambient temperature, belonging to the class of N,N-dialkyl carboxylamides, e.g. N,N-dimethylacetamide, N,N-dimethyl formamide, N,N-diethyl formamide, N,N-diethyl acetamide, N,N-dimethylmethoxyacetamide, etc. Other organic solvents may also be used, for instance dimethyl sulfoxide, N-methyl-2-pyrrolidone, hexamethylphospho triamide, metacresol, pyridine etc.

This polycondensation is effected preferably in the presence of a quantity of at least one organic base sufficient to allow complete neutralizing of the halohydric acid that is produced by the reaction. For an organic base there may be used any base that does not react appreciably with the starting compounds and whose basicity is sufficient to neutralize the halohydric cid. In particular, tertiary amines may be used, such as pyridine, triethylamine etc. So far as the amount of this base that is utilized is concerned, it is preferably equal to the stoichiometric quantity plus 1 to 10 percent in moles.

The duration and temperature of reaction that are necessary for production of a polyhydroxyamide depend upon the precise nature of the starting compounds and the solvent that is used. In general, a reaction temperature below 100°C is suitable. Preferably, even the polycondensation is effected at a temperature of the order of −10°C or even as low as −20°C, if it is desired to avoid any cyclizing of the polyhydroxyamide. However, the reaction can be effected at a temperature that may reach 200°C, all the higher if a certain degree of cyclizing can be tolerated without the polyhydroxyamide becoming insoluble and losing its film-forming capability. Preferably the work is done in a medium as anhydrous as possible.

The degree of polymerization of the polyhydroxyamide can be adjusted at will by acting on the relative proportions of the starting compounds or by using a chain terminating agent such as a monocarboxylic derivative of adamantane. When the reaction is effected with a rigidly equimolecular proportion of starting compounds, a polyhydroxyamide is obtained that has a very high molecular weight.

To obtain polyhydroxyamide films, it is highly desirable that the molecular weight of the polyhydroxyamide be such that the intrinsic viscosity of the polymer be at least equal to 0.1, preferably between 0.4 and 5.0.

The intrinsic viscosity is defined by the following equation:

$$\text{intrinsic viscosity} = \frac{\text{natural logarithm}\left(\frac{\text{viscosity of the solution}}{\text{viscosity of the solvent}}\right)}{C}$$

where C is the concentration in grams of polymer per 100 milliliters of solution.

The viscosity of the polymer solution is measured at 25°C, at a concentration of 0.5 percent, in a suitable solvent such as N,N-dimethylacetamide.

The amount of organic solvent used must be sufficient to dissolve completely at least one of the starting compounds, preferably the bis-ortho-hydroxyamine. The best results so far as film formation is concerned are obtained when the solution contains from 5 to 40 percent by weight polymer, i.e., when the solvent represents at least 60 percent by weight of the final solution.

To form a polyhydroxyamide film, there is preferably used the solution of this polymer in the reaction medium for poly-condensation. For this, we start by removing from this medium any solid substance that it might contain, by filtering under pressure, for example, through a filtering medium, preferably a porous metallic fritted body. The homogeneous solution thus obtained in then poured onto an appropriate support, e.g. a glass plate, so as to spread it in a layer of thickness ranging between 10 and 1000 microns. If necessary, a scraper can be used to impart a regular, predetermined thickness to such a layer. The solvent then is evaporated, preferably by moderate, gradual heating under reduced pressure, e.g. 40 mm mercury. For this, the heating can be done in stages up to a maximum temperature not exceeding 250°C. For example, the following heating program can be followed: 1 hour at 60°C; 1 hour at 80°C, and finally 1 hour at 150°C.

There is thus obtained a film of polyhydroxyamide that is flexible and colorless, having excellent mechanical and chemical properties. Such a film generally remains adhering to the support used for the pouring, but it is readily detached from it, e.g. by simple immersion in water at ambient temperature for about 20 minutes.

To effect cyclizing of the polyhydroxyamide to polybenzoxazole, it is possible to proceed with or without mechanical tension on the polyhydroxyamide film.

In the former case, it is sufficient to heat the film without detaching it beforehand from its support and, in the latter case, the film is detached from the support before heating.

In both cases, the cyclizing can be effected by heating to a temperature between 250° and 400°C, under reduced pressure (e.g. a pressure equal to $10^{-3}$ Torr) or under atmospheric pressure in the presence of an inert atmosphere (for example, an inert gas such as nitrogen, argon etc.)

Preferably, such heating is effected gradually and by stages. For example, the following heating program can be adopted, in the case in which cyclizing is effected without mechanical tension and under low pressure ($10^{-3}$ Torr): 2 hours at 300°C then three hours at 350°C. When the cyclizing is done with mechanical tension under an inert atmosphere, the following program can be used: 1 hour at 150°C; 2 hours at 250°C; 1 hour at 300°C and finally 2 hours at 350°C.

It is possible to show by infrared spectrophotometry that there is complete disappearance of the amide groups after a cyclizing treatment effected in the conditions just described.

The polybenzoxazoles films derived from adamantane, obtained as described above, have excellent thermal stability in air as well as under an inert atmosphere. Their decomposition temperature in air is generally at least 400°C.

The mechanical properties of these films are also excellent, especially insofar as load to rupture and modulus of elasticity are concerned. The films that have undergone cyclizing with mechanical tension generally have a higher load to rupture than those that have undergone cyclizing without tension.

According to two other embodiments of the process, there is polybondensation and cyclizing in a single step.

Thus, according to a second embodiment of the process, there is used as primary starting compound one or more dicarboxylic acids of the general formula

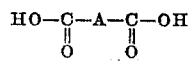

where A has the meaning indicated above, and this compound is reacted with at least one free bis-orthohydroxyamine at a temperature between 100° and 250°C in a reaction medium that includes a sufficient quantity of at least one dehydration agent, e.g. polyphosphoric acid.

According to a third embodiment of the process, the primary starting compound is one or more compounds of the general formula

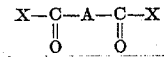

where R, A and X have the meanings indicated above, and the reaction of this compound with at least one bis-ortho-hydroxyamine is effected at a temperature between 200° and 350°C, in the absence of solvent other than the starting compounds, the said compounds being molten. The time required to attain the complete reaction, to formation of a completely cyclized polybenzoxazole is, under these conditions, between 4 and 24 hours.

EXAMPLE 1:

In 500 ml of N,N-dimethylacetamide (anhydrous) there is dissolved 17.299 g (0.08 mole) 3,3'-dihydroxy benzidine under nitrogen. After complete dissolving, this solution is cooled to $-10°C$. There is rapidly introduced 23.136 g (0.08 mole) 1,3-dimethyl 5,7-dicarboxy adamantane acid dichloride, maintaining effective agitation at a temperature of $-10°C$. The reaction is allowed to continue for one hour at the same temperature, and then 14 ml anhydrous pyridine is introduced. The temperature is then allowed to rise to ambient temperature, and agitation is continued for two hours longer, the solution having become limpid and viscous. The "prepolymer" polyhydroxyamide thus obtained is precipitated, pouring the solution into an excess of methanol and keeping up the agitation. The prepolymer is separated from this solution as a white precipitate, by filtration, with subsequent washing successively with water, methanol and ether, the precipitate then being dried under vacuum.

The intrinsic viscosity of a solution of this "prepolymer" at 0.5 percent in N,N-dimethylacetamide, measured at 25°C, is 1.13.

A film is prepared from a solution of this polymer, 10 percent by weight, in N,N-dimethylacetamide. For this, the solution is cleared of dust and solid materials that may be present by filtering under pressure through a metallic frit, and then the solution is spread on a glass plate, using a scraper. The plate thus covered with a layer of the prepolymer solution is then placed in a vacuum furnace in which the pressure is lowered to 40 mm Hg. With the pressure kept constant, the plate is subjected to the following heating program: 1 hour at 60°C; 1 hour at 80°C and 1 hour at 150°C.

A colorless film is obtained that is of excellent quality. It can readily be detached from the glass plate by prior immersion for 20 minutes of the assembly in water at ambient temperature.

The mechanical properties of this film are excellent as shown by traction tests effected on samples of standard size (6 × 50 mm) at a rate of traction of 10 percent/minute at a temperature of 24°C (chart 1). Chart 1: Traction tests at 24°C on a polyhydroxyamide film.

| | |
|---|---|
| Thickness (μ) | 37 |
| load to rupture (kg/mm²) | 12.3 |
| elongation to rupture (%) | 11 |
| modulus of elasticity (kg/mm²) | 473 |

The film whose preparation has just been described is clearly constituted by a polyhydroxyamide as shown by the infrared spectrum which presents characteristic bands of amide groups, namely bands characterized by the following values (expressed in an inverse of their wavelength):

| | |
|---|---|
| NH ("stretching") | 3.430 cm$^{-1}$ |
|  | 1.645 cm$^{-1}$ |
| NH deformation | 1.510 cm$^{-1}$ |

Using a "prepolymer" film prepared as just described, a polybenzoxazole film is prepared by cyclizing with drawing, proceding in the following manner:

A sample of the "prepolymer" film, still fixed on its support, is introduced into an enclosure filled with nitrogen, provided with an entrance and an outlet for this inert gas. In this enclosure, the film, still fixed to its support, is subjected to the following program: 1 hour at 150°C; 2 hours at 250°C; 1 hour at 300°C and 2 hours at 350°C. Throughout the cyclizing a light flow of nitrogen is caused to pass through the enclosure.

After cooling, the film is detached from its support by immersion of the assembly in water for 20 minutes. When effected in the conditions just described, the cyclizing of the polyhydroxyamide film to polybenzoxazole is complete, as demonstrated by the absence of the above-mentioned amide bands in the IR spectrum.

The mechanical properties of this film, of polybenzoxazole with adamantane base, are remarkable as shown by traction tests effected in the same conditions as those relating to the prepolymer film (Chart 2).
Chart 2: Traction tests at 24°C on a polybenzoxazole film obtained
by cyclizing under nitrogen:

| | |
|---|---|
| thickness | 32 μ |
| load to rupture | 10.5 kg/mm² |
| elongation to rupture | 7.6% |
| modulus of elasticity | 305 kg/mm² |

The thermal stability of this adamantane base polybenzoxazole film is equally remarkable. It can be demonstrated by heating a polymer sample in a dry air atmosphere or inert gas, e.g. nitrogen, from ambient temperature to a temperature that may exceed 800°C at a rate of 3°C per minute, and measuring the percentage of weight loss.

In these conditions a start of decomposition in air is observed at 400°C and a weight loss of 10 percent at 465°C, which is evidence of excellent stability to atmospheric oxidation.

In nitrogen there is a 10 percent weight loss only at 500°C, and 40 percent at 600°C.

When a polymer sample is held at 350°C in air for eight hours, the weight loss is less than 10 percent. After such a treatment, the sample still has good flexibility.

EXAMPLE 2:

A prepolymer film prepared substantially in the way described in Example 1 is cyclized without mechanical tension after detachment of the prepolymer from its support by immersion in water for 20 minutes. The film is cyclized either under a 10$^{-3}$ mm Hg vacuum or in an inert atmosphere such as nitrogen by heating at 300°C for two hours and then 350°C for three hours. The mechanical properties of a film cyclized in these conditions are the following: (chart 3)
Chart 3: Traction tests at 240°C on a polybenzoxazole film cyclized
without mechanical tension under 10$^{-3}$ mm Hg.

| | |
|---|---|
| thickness | 13 μ |
| load to rupture | 10.4 kg/mm² |
| elongation to rupture | 5.6% |
| modulus of elasticity | 320 kg/mm² |

The thermal properties are substantially the same as those of the polybenzoxazole film whose preparation was described in Example 1.

EXAMPLE 3:

Procedure as in Example 1, but with the use of dihydrochloride of 3,3'-dihydroxy benzidine instead of the free amine.

8 millimoles of the acid chloride (2.3136 g) is mixed with 8 millimoles dihydrochloride of 3,3'-dihydroxy benzidine in 50 ml N,N-dimethylacetamide at −10°C under inert atmosphere. In the course of one hour, 2.65 g anhydrous pyridine is introduced, with vigorous stirring of the reaction medium. When this introduction has been completed, there is agitation at the same temperature for one more hour, and then for two hours at ambient temperature. The isolated polymer is separated in the same way as in Example 1. The intrinsic viscosity of the prepolymer thus obtained is 0.43 which indicates that the molecular weight is lower than that of the prepolymer prepared according to Example 1. However, proceeding to preparation of a film of this prepolymer as described in Example 1, a flexible film is obtained that has properties similar to those of the prepolymer film of Example 1.

EXAMPLE 4:

The preparation of a "prepolymer" and its cyclizing to polybenzoxazole is effected as indicated in Example 1, but instead of 3,3'-dihydroxy benzidine, 3,3'-diamino 4,4'-dihydroxy diphenylsulfone is used. The polycondensation is done with use of 8 millimoles sulfone (2.2424 g), 8 millimoles acid chloride (2.3136 g), 50 ml N,N-dimethylacetamide and 2.65 g anhydrous pyridine. The intrinsic viscosity of a 0.5 percent solution in N,N'-dimethylacetamide at 25°C of the prepolymer thus obtained is 0.38. The prepolymer is semi-flexible and colorless. The polybenzoxazole that is finally obtained is also colorless.

EXAMPLES 5 to 8:

"Prepolymers" (polyhydroxyamide) are prepared by polycondensation, using the same molar proportions of the starting compounds (8 millimoles) as in Example 4, and proceding in the way indicated in Example 1, but instead of 3,3'-dihydroxy benzidine, using the following o-dihydroxylated diamines:

Example 5: 3,3'-diamino 4,4'-dihydroxy diphenyl
Example 6: 3,3'-diamino 4,4'-dihydroxy diphenyl ether
Example 7: 3,3'-diamino 4,4'-dihydroxy benzophenone
Example 8: bis 1,3-(3-amino 4-hydroxy phenyl) adamantane The "prepolymers" thus obtained are all colorless or very weakly colored, and soluble in N,N-dimethylacetamide. The thermal stability of the corresponding polybenzoxazoles obtained after cyclizing is comparable at all points with that of the polybenzoxazole obtained by the process indicated in Example 1.

EXAMPLES 9 to 11:

Procedure as in Example 1, but using the following acid dichlorides instead of the dichloride of 1,3-dimethyl 5,7-dicarboxy adamantane acid, and using the same molar proportions (8 millimoles) of the starting compounds as in Example 4.

Example 9: 1,3-dicarboxy adamantane acid dichloride
Example 10: 3,3'-dicarboxy biadamantane acid dichloride
Example 11: 3, 3',5,5'-tetramethyl 7,7'-bi-adamantane acid dichloride The prepolymers thus obtained have the characteristics of transparency and solubility in N,N-dimethylacetamide, similar to those of the "prepolymer" of Example 1, and the thermal stability of the polybenzoxazole films finally obtained is comparable at all points with that of the polybenzoxazole film of Example 1.

EXAMPLE 12:

There is heated under reduced pressure (about 10 Torr), 50 g polyphosphoric acid with a constant of 83 percent by weight $P_2O_5$, at a temperature ranging between 190° and 200°C during a time sufficient to drive out the major part of the oxygen that it contains. Purging then with nitrogen atmosphere, of the vessel in which the operation took place, and then the acid is allowed to cool, keeping it in contact with nitrogen until ambient temperature is reached.

There is then introduced into the vessel 2.162 g ($10^{-2}$ mole) 3,3'-dihydroxy benzidine, with heating at 100°C, still under nitrogen, vigorously agitating the contents of the vessel until the amine is entirely dissolved. There is then added 2.203 g ($10^{-2}$ mole) 1,3-dimethyl 5,7-dicarboxy adamantane and the vessel contents are generally brought from 100°C to 240°C, in 3 hours, and then it is held for 1 hour at this latter temperature, still under nitrogen.

The vessel contents are cooled to 100°C, then being present in the form of a viscous solution that is poured into 500 ml hot water (95°C). It then precipitates a solid mass that is washed with a hot aqueous solution of sodium carbonate, 5 percent by weight, and then with hot water, until the washing liquid is neutralized. Infrared spectrography allows identification of the solid mass as a polybenzoxazole.

EXAMPLE 13:

Procedure as in Example 12, but instead of 3,3'-dihydroxybenzidine, there is used 2.892 g ($10^{-2}$ mole) 3,3'-dihydroxy benzidine di hydrochloride.

EXAMPLE 14:

In a vessel whose atmosphere is purged with nitrogen, there is introduced a homogeneous mixture composed of 2.162 g ($10^{-2}$ mole) 3,3'-dihydroxy benzidine, and 2.203 g ($10^{-2}$ mole) 1,3-dimethyl 5,7-dicarboxy adamantane. The vessel contents are rapidly brought to 270°C, at which temperature there is observed a release of water. The vessel contents are held between 270°C and 280°C for 4 hours and then the temperature is raised to 350°C, then it is held at this latter temperature for 2 hours under a pressure of $10^{-3}$ Torr. There is thus obtained a solid mass that can be readily identified by infrared spectrography as a polybenzoxazole.

EXAMPLE 15:

Procedure as in Example 14, but using instead of 1,3-dimethyl 5,7-dicarboxy adamantane, 3.725 g ($10^{-2}$ mole) of diphenyl ester of 1,3-dimethyl 5,7-dicarboxy adamantane.

Comparison of certain properties of the adamantane base polybenzoxazoles obtained by the process that has been described with the corresponding properties of aliphatic and aromatic polybenzoxazoles allows demonstration of the fact that the former polymers present an especially interesting combination of properties.

In fact, from the point of view of thermal stability, the adamantane base polybenzoxazole prepared as described in Example 1 is superior to an aliphatic polybenzoxazole prepared by equimolecular reaction of 3,3'-dihydroxy benzidine with sebacic acid, and practically just as good as an aromatic polybenzoxazole prepared by equimolecular reaction of 3,3'-dihydroxy benzidine with isophthalic acid, as the following table shows:

| Nature of the polybenzoxazole | Starting temp. of decomposition in air (°C) | Temperature at which the loss of weight by decomposition in air is equal to 10% of the initial weight (°C) |
|---|---|---|
| polybenzoxazole prepared according to Example 1 | 400 | 465 |
| aliphatic polybenzoxazole | 300 | 330 |
| aromatic polybenzoxazole | 450 | 550 |

From the point of view of coloration, the adamantane polybenzoxazoles are colorless or only weakly colored, whereas the aromatic polybenzoxazoles are the aliphatic polybenzoxazoles with unsaturated aliphatic groups have an intense coloration, going from yellow to reddish brown.

For example, the aromatic polybenzoxazoles or aliphatic polybenzoxazoles prepared by equimolecular reaction of the following compounds are respectively colored as follows:

| Nature of the starting compounds | Color of the final product |
|---|---|
| 3,3'-dihydroxy benzidine and isophthalic acid dichloride | yellow |
| 3,3'-dihydroxy benzidine and terephthalic acid dichloride | intense yellow |
| 3,3'-dihydroxy benzidine and maleic acid dichloride or furmaric acid dichloride | reddish brown |

From the point of view of solubility, whereas the aromatic polybenzoxazoles are soluble only in concentrated sulfuric acid, the adamantane polybenzoxazoles, while being also soluble in sulfiric acid, are hot soluble in certain organic compounds, e.g. in meta cresol, and nitrobenzene, and even weakly soluble in other solvents that are not so strong, eg. in N-methyl pyrrolidone and anisole.

Finally, from the point of view of mechanical properties, the adamantane base polybenzoxazoles have characteristics, particularly values relating to elasticity and tension to rupture, that are superior to those of aromatic polybenzoxazoles of analagous structure, as shown in the following table:

| Nature of the polybenzoxazole | tension to rupture (kg/cm²) | elongation to rupture (%) |
|---|---|---|
| aromatic polybenzoxazole obtained by equimolecular reaction from 3,3'-dihydroxy benzidine and isophthalic acid dichloride | 900 | 2.6 |
| adamantane base polybenzoxazole as described in Example 1 | 1050 | 7.7 |

What is claimed is:

1. Polybenzoxazole consisting essentially of recurrent units forming macromolecular chains and being of one of the two following formulas:

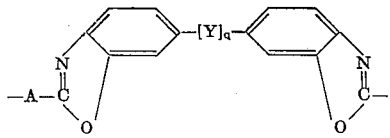

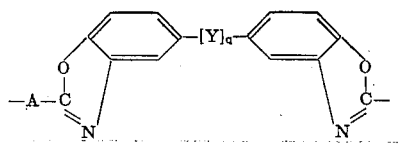

in which
Y represents one of the following atoms or groups:

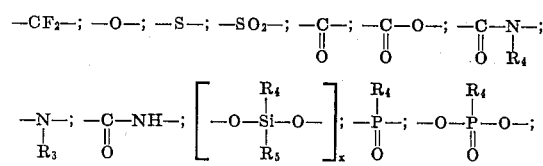

and

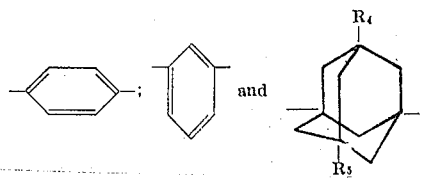

$R_4$ and $R_5$ each representing an alkyl or alkoxy group with 20 carbon atoms at the most, or a phenyl or phenoxy group, and x is a whole number equal to 3 at the most;

q is 0 or 1;

A is a divalent organic group having one of the two following formulas:

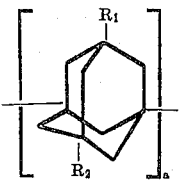

or

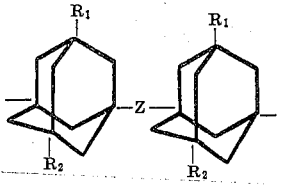

wherein
a is a whole number equal at the most to 3,
$R_1$ and $R_2$ each represent an atom or group selected from among the following: H, alkyl with at the most 20 carbon atoms, $CF_3$, $Si(R_3)_3$, adamantyl, phenyl, alkoxy with 20 carbon atoms at the most, O-$Si(R_3)_3$, $R_3$ being a phenyl radical or an alkyl radical with 20 carbon atoms at the most, and
Z represents one of the following atoms or groups:

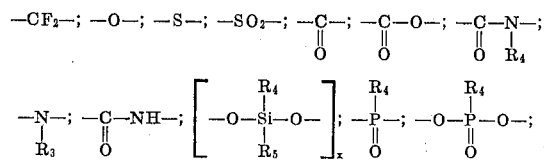

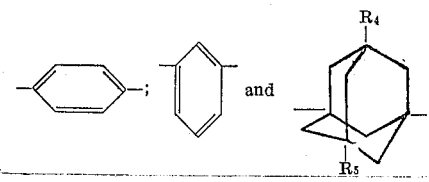

$R_4$ and $R_5$ each representing an alkyl or alkoxy group having 20 carbon atoms at the most, or a phenyl or phenoxy group, and x is a whole number equal to 3 at the most.

* * * * *